(12) United States Patent
Knipfer et al.

(10) Patent No.: US 7,970,638 B2
(45) Date of Patent: Jun. 28, 2011

(54) PLANNING PARTS DEMAND COVERAGE BASED ON VARIABLE PERCENTAGE OF SUBSTITUTION PARTS

(75) Inventors: Ivory Wellman Knipfer, Rochester, MN (US); William Robert Taylor, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1235 days.

(21) Appl. No.: 11/560,188

(22) Filed: Nov. 15, 2006

(65) Prior Publication Data
US 2008/0114640 A1   May 15, 2008

(51) Int. Cl.
*G06Q 10/00* (2006.01)
(52) U.S. Cl. ................................................ 705/7.11
(58) Field of Classification Search ................ 705/10
See application file for complete search history.

(56) References Cited

U.S. PATENT DOCUMENTS

| | | | |
|---|---|---|---|
| 5,315,509 A | 5/1994 | Natarajan | |
| 5,943,484 A | 8/1999 | Milne et al. | |
| 5,971,585 A | 10/1999 | Dangat et al. | |
| 6,701,201 B2* | 3/2004 | Hegde et al. | 700/107 |
| 6,898,472 B2 | 5/2005 | Crampton et al. | |
| 6,983,190 B2* | 1/2006 | Denton et al. | 700/103 |
| 7,058,587 B1* | 6/2006 | Horne | 705/7 |
| 2004/0162627 A1 | 8/2004 | Minami et al. | |
| 2005/0171827 A1 | 8/2005 | Denton et al. | |

OTHER PUBLICATIONS

Chen, J. et al. "Optimal Control of a Multi-Product Inventory System with Substitution" in Proceedings of the 38th Conference on Decision & Control Phoenix, Arizona USA Dec. 1999.*
Gallego, et al. "Semiconductor inventory management with multiple grade parts and downgrading", Production Planning & Control, vol. 17, No. 7, Oct. 2006, 689-700.*

* cited by examiner

*Primary Examiner* — Lynda C Jasmin
*Assistant Examiner* — Mark A Fleischer
(74) *Attorney, Agent, or Firm* — Yee & Associates, P.C.; Steven L. Bennett

(57) ABSTRACT

A method is provided for meeting anticipated parts demands, by controlling substitute part inventory coverage based on percentage requirements. The method is characterized by substitution sets determined as a ratio of the current PN level. In one embodiment, current parts of specified type and substitute parts functionally equivalent to the current parts are respectively kept in inventory. This embodiment includes specifying a maximum percentage of demand for the current parts that is allowed to be filled using substitute parts. The number of additional parts needed to cover a demand is determined, when the demand specifies a total number of current parts exceeding the number thereof in inventory. A number of substitute parts is then assigned from inventory to cover the demand, up to a number that does not exceed the specified maximum percentage of the specified total number. When the number of additional parts needed is greater than the number of assigned substitute parts, a number of current parts equal to the difference therebetween is then purchased.

18 Claims, 4 Drawing Sheets

| | SCENARIO | QUANTITY | |
|---|---|---|---|
| (A) | PART FORECAST DEMAND | 300 | |
| (B) | CURRENT PART INVENTORY | 10 | |
| (C) | SUBSTITUTE PART INVENTORY (SIMPLE 1 PART) | 350 | |
| | | INDUSTRY | VARIABLE |
| (D) | % THAT CAN COME FROM SUBSTITUTE PARTS | 100% | 80% |
| (E) | HOW MANY PARTS CAN BE USED FROM SUBSTITUTE PARTS? | 300 | 240 |
| (F) | HOW MANY PARTS SATISFIED BY "CURRENT PART" INVENTORY? | 10 | 10 |
| (G) | HOW MANY PARTS SATISFIED BY "SUBSTITUTE PART" INVENTORY? | 290 | 240 |
| (H) | HOW MANY PARTS UNSATISFIED REQUIRING ADDITIONAL PURCHASE? | 0 | 50 |
| (I) | MANUAL MISCELLANEOUS PLANNING FOR CURRENT PART | 50 | 0 |

*FIG. 1*

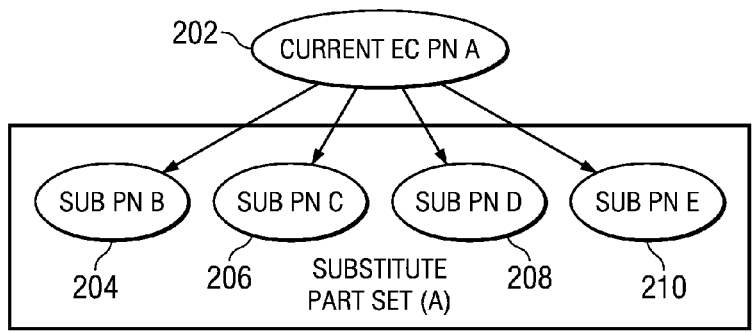

*FIG. 2A*
*(PRIOR ART)*

PLANNING PARTS DEMAND COVERAGE BASED ON VARIABLE PERCENTAGE OF SUBSTITUTION PARTS

BACKGROUND OF THE INVENTION

1. Field of the Invention

The invention disclosed and claimed herein generally pertains to a method for analyzing demand coverage, in view of forecast or anticipated demand for parts of specified types. More particularly, the invention pertains to a method of the above type wherein the inventory contains both current parts of the specified type, and substitute parts that are functionally equivalent to the current parts. Even more particularly, the invention pertains to a method of the above type for optimizing substitute part usage, maximizing the potential for on-hand inventory to meet serviceability requirements, and minimizing the potential for inventory carrying costs.

2. Description of the Related Art

It is frequently necessary to introduce a modified form of a manufactured part that complies with certain regulations, in order to use the part on certain products or to ship it into certain countries or jurisdictions. For example, a country may decide to demand compliance with RoHS (Restriction of Hazardous Substances) standards, so that a certain material can no longer be used in a particular type of part. Accordingly, the part manufacturer will design a modified part that is functionally equivalent to the previous parts, but no longer uses the material. Typically, the new part will become the "current" part of that particular part type.

When the new current part is introduced, it is likely that there will still be a number of older parts, and possibly a very large number, remaining in inventory. Since these parts and the new current parts are functionally equivalent to one another, the older parts can still be readily substituted for the new current parts, for many applications. Thus, if some countries are not concerned about the RoHS material that led to the new current parts, the older parts can continue to be used for products sent to those countries. At least some of the time it is beneficial to substitute older parts for the current parts, when this is permitted. As a result, it has become common, when analyzing future or upcoming demand for a particular part, to consider the portion of the demand that must be covered using current parts, and the portion that is allowed to be covered using older parts. For example, it may be determined, based on experience and other factors, that 60% of the anticipated demand for a particular part type will need current parts, whereas the older parts can be used as substitutes to meet 40% of the demand.

Present planning systems such as the Manufacturing Resource Planning (MRP) have no capability for automatically ensuring that percentages of the above type will be considered, when planning demand coverage that apportions between current new parts and equivalent older substitute parts. As a result, significant manual planning effort may be required, in order to ensure that current part percentage requirements are complied with. This deficiency may also result in ineffective application in the use of substitute parts.

One present solution to this problem is to supplement MRP recommendations with significant manual planning. This approach uses existing MRP recommendations and substitution logic, and then augments this with miscellaneous demands to procure specific required parts. However, this solution tends to result in excess inventory and scrap, as well as significant manual effort to independently manage the miscellaneous demands on a part-by-part basis.

A further solution is to manually override the MRP results, in order to adjust purchasing recommendations on a part-by-part basis. This is very manually intensive, and would be subject to change based on the demand and inventory levels, both in manufacturing and at the vendor, for every MRP run.

Another approach is to release a new Bill of Material for a new current part, and manage it independently from the equivalent older parts that can be substituted for the new part. This, however, tends to drive the purchasing of incorrect parts in the substitute structure, and also drives significant inventory increases.

Yet another solution would be to simply break in a new current part, and allow for no substitutions using older parts. This, however, would lead to increased inventory and/or scrap costs to the product.

There is currently no known automated process that allows a variable percentage of parts substitution while minimizing needed inventory. The labor to manage such situations manually is excessive, and can significantly impact inventory by driving costs and serviceability issues.

BRIEF SUMMARY OF THE INVENTION

The invention generally provides a new process for meeting anticipated parts demands, by implementing a variable percentage and nested based schema for controlling substitute part inventory coverage. Key elements of the process include a new model containing variable substitution sets, and a method of recursively evaluating the new variable substitution model and enforcing variable (percentage) netting of demand to on-hand inventory. Also, a new netting logic is applied to alter and/or determine the correct parts and quantity that need to be purchased. The new model is characterized by substitution sets determined as a ratio of the current part number (PN) level, which is the primary purchased part level. The model is able to group substitutions into multiple sets as well as on a PN-by-PN basis, in order to allow like grouping and application. Also, the model can sequence the evaluation order of the substitution groups, and can nest such groups.

One embodiment of the invention is directed to a method for planning parts coverage, wherein current parts of the specified type and substitute parts that are functionally equivalent to the current parts are respectively kept in inventory. The method includes specifying a maximum percentage of demand for the current parts that is allowed to be filled using substitute parts, wherein the percentage can be less than 100%. The number of additional parts that are needed to cover a given anticipated demand is then determined, when the given demand specifies a total number of current parts that exceeds the number of current parts then in inventory. The method further includes assigning a number of substitute parts from inventory to cover the given demand, up to a number that does not exceed the specified maximum percentage of the specified total number. When the number of additional parts needed is greater than the number of assigned substitute parts, a number of current parts to be acquired is determined that is equal to the difference between the respective additional and assigned numbers of parts.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 shows an informational chart for use in illustrating an embodiment of the invention.

FIGS. 2A and 2B are schematic diagrams illustrating concepts of the prior art and the invention, respectively.

DETAILED DESCRIPTION OF THE INVENTION

Figure 2B:
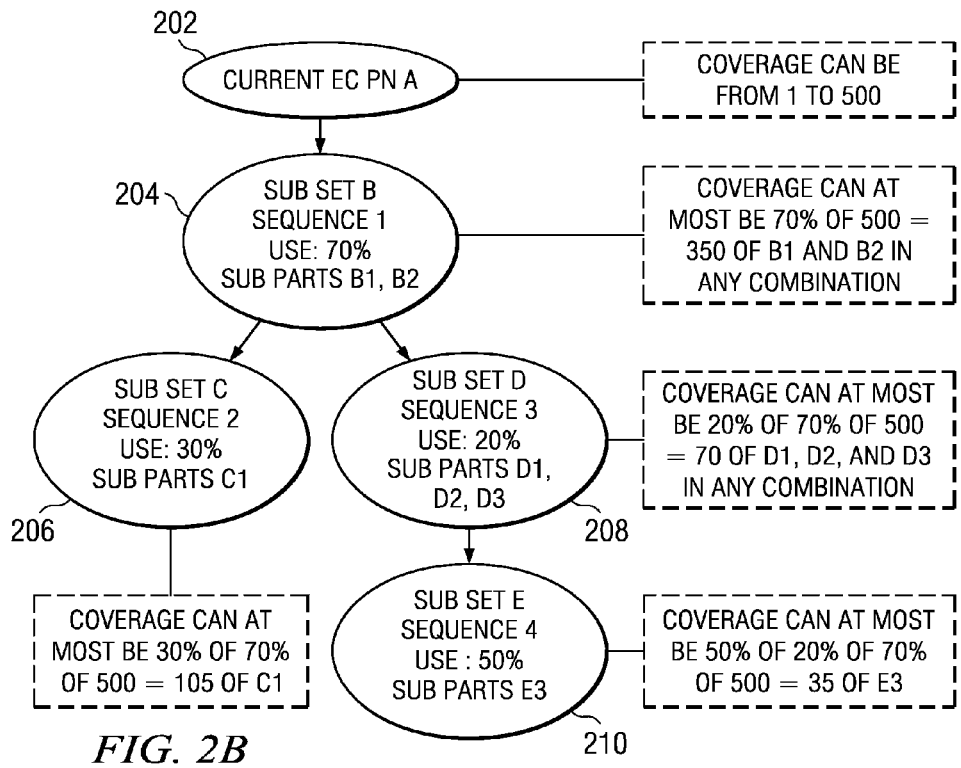

In planning the coverage of a forecast demand for a particular part, it is conventional industry practice to assume that substitute parts, as described above, can be used to supply up to 100% of the needed current parts. Such coverage planning thus disregards the requirement that some percentage of the total parts demand must be limited to current parts only. Accordingly, embodiments of the invention provide a demand coverage planning method that is based on or takes into account the ratios or percentages that must be apportioned between current and substitute parts, respectively, in view of percentage requirements of the type described above.

Referring to FIG. 1, there is shown a chart that uses an example to illustrate significant benefits of the method of the invention. Rows (A)-(C) respectively indicate a part forecast demand of 300, and further indicate that there are 10 current parts and 350 substitute parts in inventory. For simplicity, it is assumed that there is only a single type of part available as a substitute for the current part. It is further assumed that for the particular part type, 20% of the demand coverage mandates current parts, and 80% of the coverage is permitted to be substitute parts.

FIG. 1 further shows two columns, one labeled Industry and the other labeled Variable. Rows (D)-(I) of the Industry column disclose results of following conventional industry practice, whereas rows (D)-(I) of the Variable column indicate the results provided by an embodiment of the invention.

As discussed above, present conventional practice allows 100% of a demand for current parts to be satisfied with available substitute parts. Since there are 350 substitute parts in inventory, the entire demand of 300 parts could be covered with substitute parts under conventional practice. With 10 current parts in inventory, the remaining demand requirement could be satisfied with 290 of the substitute parts from inventory. It would therefore not be necessary to purchase any additional parts, as shown by row (H). Only current parts, of course, can be purchased or otherwise acquired, whenever there is a need to obtain parts that are not available in inventory. Substitute parts are generally no longer being produced.

Referring further to FIG. 1, rows (D)-(H) of the Variable column show that only 80% of the 300 part demand, or 240, can be substitute parts. Thus, with the 10 current parts, only a total of 250 current and substitute parts are available from inventory, to cover the 300 part demand. It is therefore necessary to purchase 50 additional current parts.

Row (I) of the chart in FIG. 1 emphasizes the significant difference between conventional industry practice and the method of the invention. The industry approach overuses substitute parts, since it does not account for the mandatory current part percentage requirement. As a result, it will be necessary to make plans at some later time to acquire 50 current parts, in order to avoid impacting product shipment capability. Typically, such acquisition will require substantial and inefficient manual effort. In contrast, the method of the invention automatically accounts for the mandatory current part percentage. Accordingly, row (I) of the chart in FIG. 1 shows that it will not be necessary to purchase additional current parts at some time in the future.

To illustrate a more complicated example, FIGS. 2A and 2B show a current part set 202 that has a current Part A of part number (PN), resulting from an engineering change (EC) to a part of particular type. FIGS. 2A and 2B further show that a number of different parts B-E, included in substitute part sets 204-210, respectively, can be used as substitute parts for current part A. Parts E of substitute part set 210 may be the oldest of the particular part type still in inventory. Alternatively, part E may have the lowest ranking, for some other reason, in a sequential order in which each of the parts B-E is ranked. Parts C and D of sets 206 and 208 were introduced after the parts E, and parts B of set 204 were introduced after parts C and D. All the parts of substitute part sets 204-210 are functionally equivalent to current part A of part set 202, and can thus be used as substitute parts therefor, whenever substitute parts are allowed. Moreover, each of the substitute part sets may include several part variations. For example, substitute part set 208 includes part variations D1, D2, and D3.

Even though there are differences between parts that can be substituted for current part A, the present practice of industry is to consider all substitute parts as being the same, and to disregard any differences therebetween in selecting substitute parts as replacements for the current part. This industry practice is illustrated by FIG. 2A. However, in an embodiment of the invention depicted in FIG. 2B, parts of different substitute part sets are treated in a hierarchical or ranked sequential manner. That is, it is recognized that whenever a new part was introduced to become the current part, there may have been a percentage applied to the older part that was being replaced. For example, when part D of substitute part set 208 became the current part, there could have been a requirement that up to 50% of a demand for the then current part D could be covered by substituting parts E, from substitute part set 210.

Referring further to FIG. 2B, there are shown substitute part sets 204-210 arranged in a nested configuration to illustrate a procedure comprising a series of sequences. Each sequence is based on a demand percentage requirement associated with a substitute part that may have previously been the current part, or is a substitute part for some other reason. To further illustrate the procedure, it is assumed that there is a demand of 500 parts for current part A of part set 202.

During a processing Sequence 1 of the procedure, FIG. 2B shows that up to 70% of the 500 part demand, or 350 parts, can be any combination of parts B1 or B2 from substitute part set 204. However, because of the equivalency between parts B and C, up to 30% of the coverage for parts B can be parts C1 from substitute part set 206. Accordingly, during Sequence 2 it is determined that in covering the 500 part demand for current part A, a maximum of 30% of 70% of 500, or 105 parts, can be parts C1 from part set 206. Similarly, up to 20% of the coverage for parts B can be parts D1, D2 or D3 from substitute part set 208. Sequence 3 therefore determines that coverage from substitute part set 208 for the current part demand can be at most 20% of 70% of 500, or 70 parts, wherein the 70 parts may be any combination of D1, D2 and D3. Finally, Sequence 4 determines that coverage of D parts provided by E3 parts of substitute part set 210 can at most be 50%. Thus, E parts can provide up to 50% of 20% of 70% of the 500 part demand, or 35 parts. It is thus seen that the procedure described in connection with FIG. 2B determines the maximum number of parts that are allowed to come from each of the substitute part sets 204-210, for a given demand for current parts A.

Figure 3:
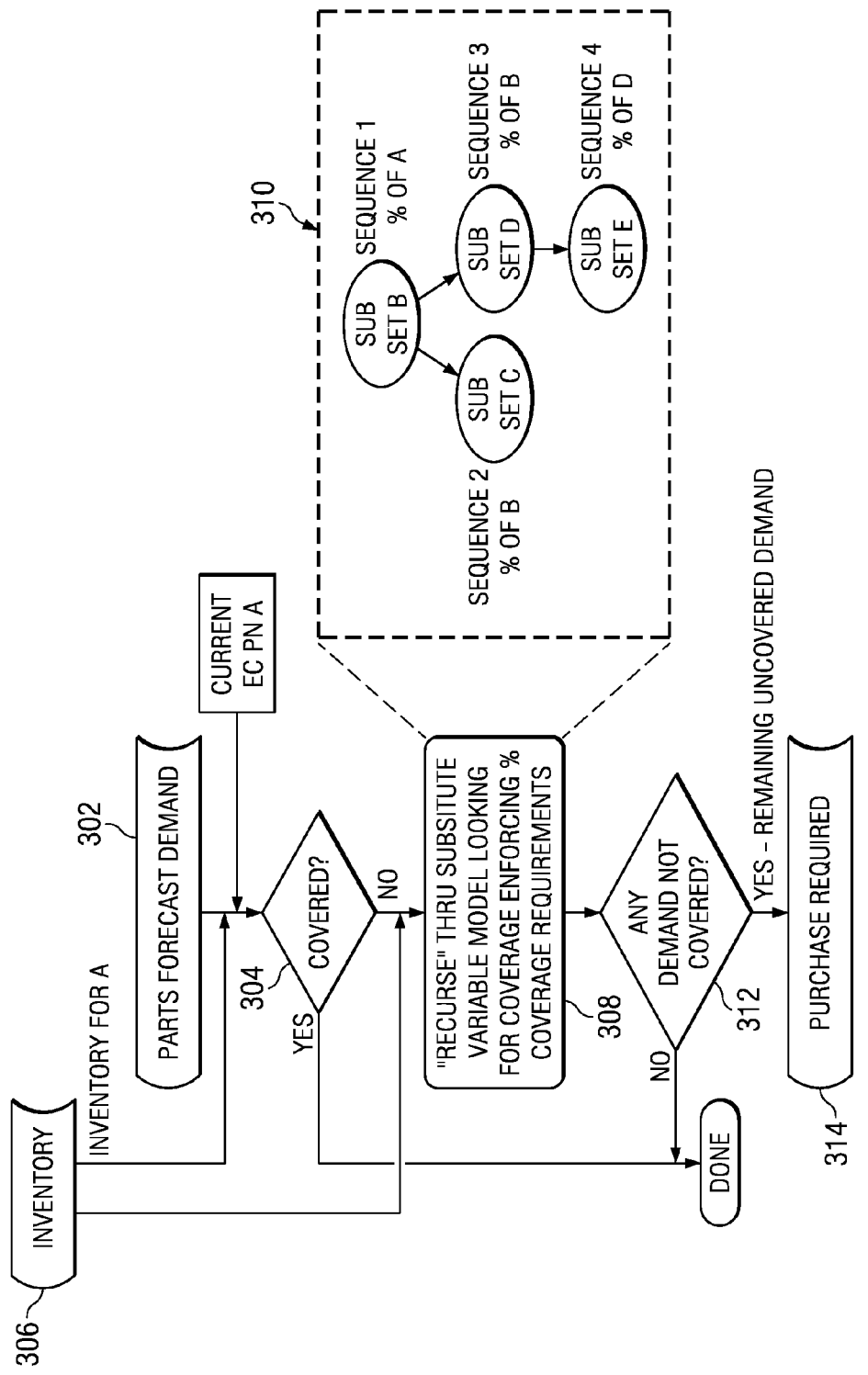
FIG. 3 is a flow chart illustrating an embodiment of the invention.

Referring to FIG. 3, there is shown a flow chart pertaining to an overall method that uses the above procedure of FIG. 2B. At step 302 of FIG. 3, a forecast demand is provided for a number of parts having the PN of current part A, such as the 500 part demand described above. At step 304, the number of parts specified by the demand is compared with information from inventory 306, wherein such information indicates the total number of current parts A then in inventory. If the number of such parts is at least equal to the demand number, the demand is covered, and the method shown by FIG. 3 comes to an end. However, if the number of current parts in inventory is not sufficient to cover the demand, the method of FIG. 3 moves to step 308.

At step 308 the procedure of FIG. 2B is carried out, to provide the maximum number of parts that are allowed to come from respective substitute part sets 204-210 for the particular demand. The hierarchically ranked part sets are collectively represented as 310 in FIG. 3. After determining the maximum number of each substitute part (B)-(E) that can be used to satisfy the particular demand, information is obtained from the inventory to determine the actual numbers of substitute parts (B)-(E) that are respectively contained therein. From this information and the maximum numbers for respective substitute parts, a suitably programmed processor can readily determine whether the total available substitute parts (B)-(E) are sufficient to cover any difference between the forecast demand for current parts A, and the number of current parts A that are available in the inventory 306.

The sufficiency of the substitute parts to cover demand is considered at step 312. If the sum of current parts and substitute parts in inventory can cover the demand, subject to respective mandatory percentage requirements, the method of FIG. 3 comes to an end. Otherwise, an additional number of current parts to cover demand is purchased at step 314.

Figure 4:
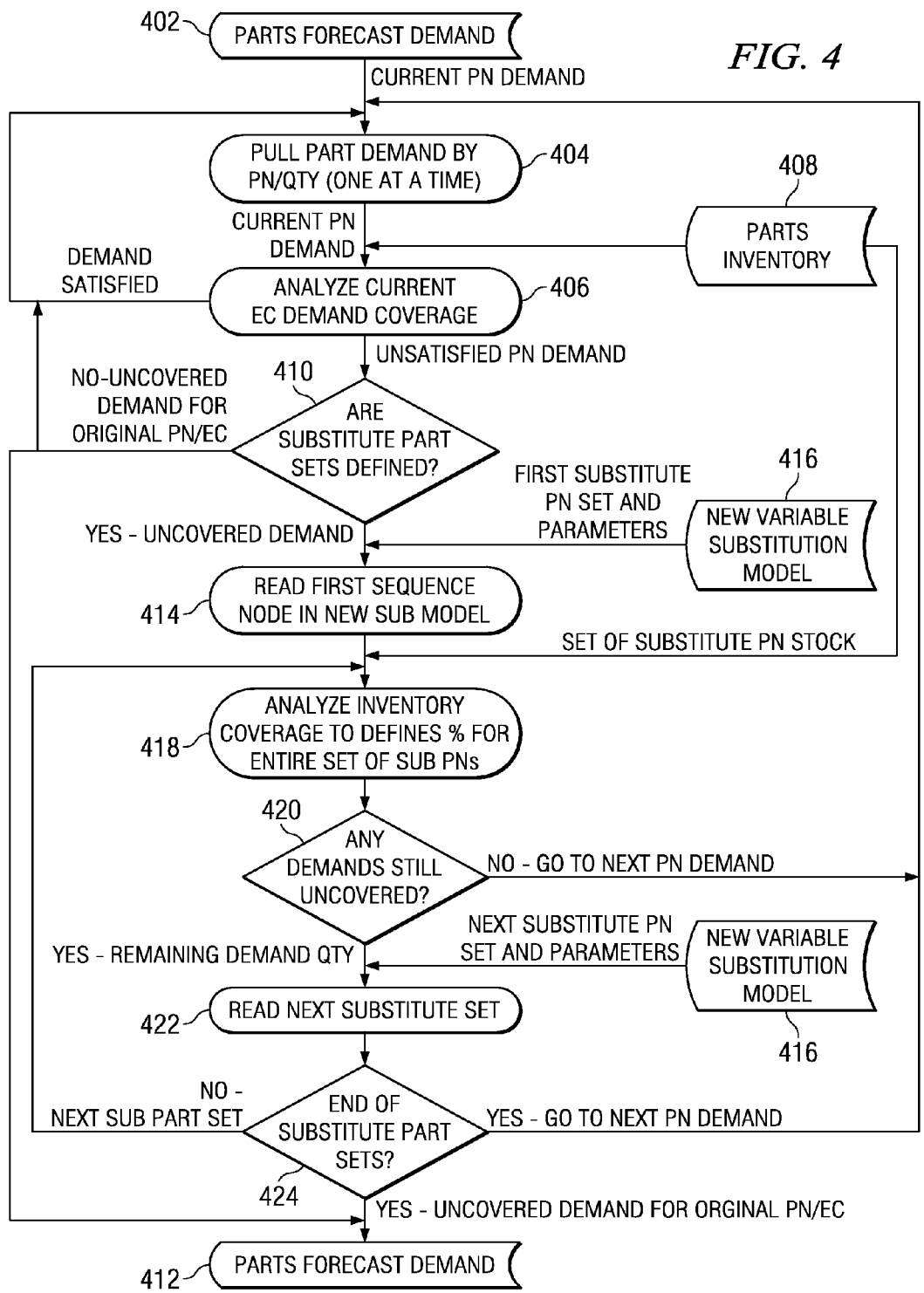
FIG. 4 is a flow chart illustrating a further embodiment of the invention.

Referring to FIG. 4, there is shown an embodiment of the invention directed to a method for analyzing and planning coverage of a parts forecast demand 402, wherein demand 402 pertains to a multiplicity of part types having different PNs. The different part types of demand 402 are considered sequentially, by PN. Thus, at step 404 information for a particular current part PN, including the needed quantity (QTY) of such part, is pulled from the demand 402.

At step 406, information is obtained from parts inventory 408 indicating the number of particular current parts then contained in inventory. Such information is used to determine whether there are sufficient particular parts in inventory to satisfy the quantity thereof required by the demand. If the demand is satisfied, the method returns to step 404, and pulls down demand information for the next current PN, that follows the particular part in demand 402.

If the demand for the particular current part is not satisfied, step 410 determines whether or not there are any substitute part sets that are defined for the particular current part. If there are none, step 412 is carried out, to arrange for purchase of sufficient particular current parts to cover the unsatisfied demand. Also, the method returns to step 404, and pulls down demand information for the next current PN.

If it is determined at step 410 that one or more substitute part sets are defined for the particular current part, the method of FIG. 4 proceeds to step 414. This step reads or acquires information identifying each part in the first defined substitute part set, including parameters pertaining thereto, from a substitution model 416. For example, if the first set was substitute part set 204, described above in connection with FIG. 2B, the acquired information would indicate that any combination of parts B1 and B2 could be substituted, for up to 70% of the total current part demand. At step 418 such information would be analyzed, together with the numbers of parts B1 and B2 that were then in inventory, as provided by inventory 408. The analysis would indicate whether or not the number of parts B1 and B2 in inventory would satisfy the uncovered demand, subject to the current part percentage requirements as described above in connection with FIG. 2B and FIG. 3.

In accordance with step 420, if it is determined that parts of the first substitute part set are able to meet the uncovered demand, the method returns to step 404. Demand information is then pulled down for the next following current PN, as described above. However, if it is determined at step 420 that current part demand is still uncovered, the method of FIG. 4 proceeds to step 422, and reads information pertaining to the substitute part set that next follows the first substitute part set. This information is also supplied by model 416. Thus, if the next set was substitute part set 206, as described above, the acquired information would indicate that part C could be substituted for up to 30% of total part demand that could be supplied from the immediately preceding substitute part set.

At step 424, information for the next following substitute part set is routed back to step 418, and analyzed in view of the percentage requirements and availability of parts in inventory for such part set. Again at step 420, if it is determined that parts of the substitution part set are able to meet the uncovered demand, the method returns to step 404. Otherwise, information for the next substitute part set is read for model 416 at step 422.

It will be seen from FIG. 4 that steps 418-424 collectively define a looped process that sequentially considers each of the substitute part sets associated with a particular current part. This process continues until (1) the demand is fully covered by the substitute parts, whereupon the method returns to step 404, or (2) the demand is still uncovered, and it is determined at step 424 that there are no more substitute part sets for the particular current part. When this occurs, plans are made at step 412 to purchase current parts to meet the uncovered demand. Also, the next current part is pulled at step 404.

Figure 5:
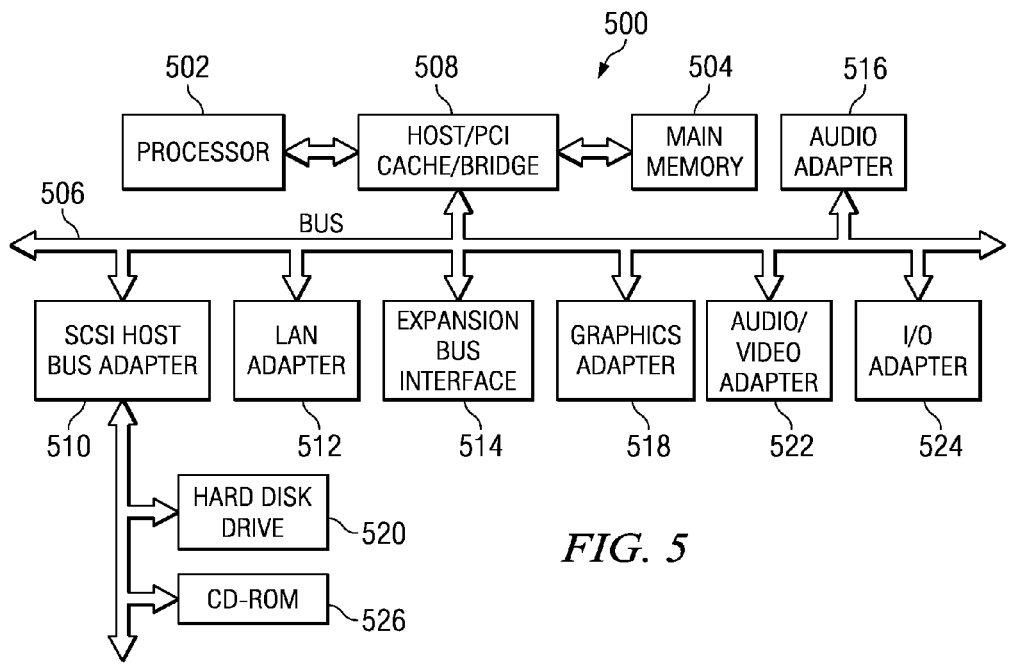
FIG. 5 is a block diagram showing a data processing system for use in implementing embodiments of the invention.

Referring to FIG. 5, there is shown a block diagram of a generalized data processing system 500 which may be used in implementing embodiments of the present invention, such as by carrying out methods and procedures as described in connection with FIGS. 2B, 3 and 4. Data processing system 500 exemplifies a computer in which code or instructions for implementing the processes of the present invention may be located. Data processing system 500 usefully employs a peripheral component interconnect (PCI) local bus architecture. FIG. 5 shows a processor 502 and main memory 504 connected to a PCI local bus 506 through a Host/PCI bridge 508. PCI bridge 508 also may include an integrated memory controller and cache memory for processor 502.

Referring further to FIG. 5, there is shown a local area network (LAN) adapter 512, a small computer system interface (SCSI) host bus adapter 510, and an expansion bus interface 514 respectively connected to PCI local bus 506 by direct component connection. Audio adapter 516, a graphics adapter 518, and audio/video adapter 522 are connected to PCI local bus 506 by means of add-in boards inserted into expansion slots. One or more I/O adapters 524 may also be inserted into PCI bus 506 as plug-in devices. SCSI host bus adapter 510 provides a connection for hard disk drive 520, and also for CD-ROM drive 526.

An operating system runs on processor 502 and is used to coordinate and provide control of various components within data processing system 500 shown in FIG. 5. The operating system may be a commercially available operating system. Instructions for the operating system and for applications or programs are located on storage devices, such as hard disk drive 520, and may be loaded into main memory 504 for execution by processor 502.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for planning parts coverage, wherein current parts of a specified type, and substitute parts that are functionally equivalent to the current parts, are respectively kept in inventory, said method comprising the steps of:

wherein each one of said current parts was produced by modifying one of said substitute parts;

forecasting a demand for said current parts;

during said forecasting, predetermining a maximum percentage of said demand for said current parts to be filled using said substitute parts, wherein said percentage is less than one hundred percent, wherein each substitution for one of said current parts requires no more than one of said substitute parts and requires an entire one of said substitute parts, and wherein substitutions are always made in order to fulfill said demand;

determining, using a processor that is included in the data processing system, the quantity of additional parts that are needed to cover a given anticipated demand, when said given demand specifies a total quantity of current parts that exceeds the quantity of current parts then in inventory;

assigning a quantity of said substitute parts from inventory to cover said given demand, up to a quantity that does not exceed said predetermined maximum percentage of said specified total quantity of current parts; and determining, using said processor, a quantity of said current parts to be acquired that is equal to the difference between said quantity of additional needed parts and said assigned quantity of substitute parts, when said quantity of additional needed parts is greater than said assigned quantity of parts.

2. The method of claim 1, wherein:

said assigned quantity of substitute parts is equal to the lesser of said quantity of additional needed parts, the total quantity of substitute parts then in inventory, and said maximum percentage of said total quantity.

3. The method of claim 1, further comprising:

determining a selectively ranked order of distinct substitute part sets, wherein a substitute part from each one of said distinct substitute part sets can be used as one of said substitute parts.

4. The method of claim 3, wherein:

a substitute part from one of said distinct substitute part sets is evaluated and then a substitute part from a next one of said distinct substitute part sets in said ranked order is evaluated.

5. The method of claim 3, wherein:

the maximum quantity of parts that can be assigned from a given substitute part set is a pre-specified percentage of the maximum quantity of parts that can be assigned from the substitute part set that is directly above said given set in said ranked order.

6. The method of claim 3, wherein:

using a recursive tree to determine said selectively ranked order.

7. The method of claim 3, wherein:

the parts of said substitute part sets respectively have discrete part numbers for use in controlling assignment of parts.

8. A computer-executable program product comprising computer executable instructions tangibly embodied on a non-transitory computer readable medium for planning parts coverage, wherein current parts of the specified type, and substitute parts that are functionally equivalent to the current parts, are respectively kept in inventory, said computer program product comprising:

wherein said current parts were produced by modifying said substitute parts;

first instructions for, forecasting a demand for said current parts and during said forecasting, predetermining a maximum percentage of said demand for said current parts to be filled using said substitute parts, wherein said percentage is less than one hundred percent, wherein each substitution for one of said current parts requires no more than one of said substitute parts and requires an entire one of said substitute parts, and wherein substitutions are always made in order to fulfill said demand;

second instructions for determining the quantity of additional parts that are needed to cover a given anticipated demand, when said given demand specifies a total quantity of current parts that exceeds the quantity of current parts then in inventory;

third instructions for assigning a quantity of said substitute parts from inventory to cover said given demand, up to a quantity that does not exceed said specified maximum percentage of said total quantity of current parts; and fourth instructions for determining a quantity of said current parts to be acquired that is equal to the difference between said quantity of additional needed parts and said assigned quantity of substitute parts, when said quantity of additional needed parts is greater than said assigned quantity of parts.

9. The computer program product of claim 8, wherein:
said assigned quantity of substitute parts is equal to the lesser of said quantity of additional needed parts, the total quantity of substitute parts then in inventory, and said maximum percentage of said specified total quantity.

10. The computer program product of claim 8, further comprising:
a selectively ranked order of distinct substitute part sets, wherein a substitute part from each one of said distinct substitute part sets can be used as one of said substitute parts.

11. The computer program product of claim 10, wherein:
a substitute part from one of said distinct substitute part sets is evaluated and then a substitute part from a next one of said distinct substitute part sets in said ranked order is evaluated.

12. The computer program product claim 10, wherein:
the maximum quantity of parts that can be assigned from a given substitute part set is a pre-specified percentage of the maximum quantity of parts that can be assigned from the substitute part set that is directly above said given set in said ranked order.

13. The computer program product of claim 10, wherein:
using a recursive tree to determine said selectively ranked order.

14. Apparatus for planning parts coverage, wherein current parts of a type, and substitute parts that are functionally equivalent to the current parts, are respectively kept in inventory, comprising:
wherein each one of said current parts was produced by modifying one of said substitute parts;
a processor utilizing a first processing component for forecasting a demand for said current parts and during, during said forecasting, predetermining a maximum percentage of said demand for said current parts to be filled using said substitute parts, wherein said percentage is less than one hundred percent, wherein each substitution for one of said current parts requires no more than one of said substitute parts and requires an entire one of said substitute parts, and wherein substitutions are always made in order to fulfill said demand;

the processor utilizing a second processing component for determining the quantity of additional parts that are needed to cover a given anticipated demand, when said given demand specifies a total quantity of current parts that exceeds the quantity of current parts then in inventory;

the processor utilizing a third processing component for assigning a quantity of said substitute parts from inventory to cover said given demand, up to a quantity that does not exceed said specified maximum percentage of said specified total quantity of current parts; and the processor utilizing a fourth processing component for determining a quantity of said current parts to be acquired that is equal to the difference between said quantity of additional needed parts and said assigned quantity of substitute parts, when said quantity of additional needed parts is greater than said assigned quantity of parts.

15. The apparatus of claim 14, wherein:
said third processing component assigns a quantity of substitute parts that is equal to the lesser of said quantity of additional needed parts, the total quantity of substitute parts then in inventory, and said specified maximum percentage of said specified total quantity.

16. The apparatus of claim 14, wherein:
a selectively ranked order of distinct substitute part sets, wherein a substitute part from each one of said distinct substitute part sets can be used as one of said substitute parts.

17. The apparatus of claim 16, wherein:
a substitute part from one of said distinct substitute part sets is evaluated and then a substitute part from a next one of said distinct substitute part sets in said ranked order is evaluated.

18. The apparatus of claim 16, wherein:
using a recursive tree to determine said selectively ranked order.

\* \* \* \* \*